Jan. 9, 1968 J. J. GETMAN ETAL 3,363,042
METHOD AND APPARATUS FOR EXTRUDING STRAIGHT OR CURVED PIPES
AND SIMILAR ARTICLES OUT OF CEMENT MIX AND LIKE MATERIALS
Filed Sept. 16, 1963 5 Sheets-Sheet 1

FIG. I.

INVENTORS
JOSEPH J. GETMAN
ARTHUR J. GETMAN
BY
*Byerly, Townsend, Watson & Churchill*
ATTORNEYS.

Jan. 9, 1968  J. J. GETMAN ET AL  3,363,042
METHOD AND APPARATUS FOR EXTRUDING STRAIGHT OR CURVED PIPES
AND SIMILAR ARTICLES OUT OF CEMENT MIX AND LIKE MATERIALS
Filed Sept. 16, 1963  5 Sheets-Sheet 3

INVENTORS
JOSEPH J. GETMAN
ARTHUR J. GETMAN
BY
Byerly, Townsend, Watson & Churchill

ATTORNEYS.

Jan. 9, 1968  J. J. GETMAN ET AL  3,363,042
METHOD AND APPARATUS FOR EXTRUDING STRAIGHT OR CURVED PIPES
AND SIMILAR ARTICLES OUT OF CEMENT MIX AND LIKE MATERIALS
Filed Sept. 16, 1963  5 Sheets-Sheet 4

INVENTORS
JOSEPH J. GETMAN
ARTHUR J. GETMAN
BY
Byerly, Townsend, Watson & Churchill
ATTORNEYS.

United States Patent Office 3,363,042
Patented Jan. 9, 1968

3,363,042
METHOD AND APPARATUS FOR EXTRUDING STRAIGHT OR CURVED PIPES AND SIMILAR ARTICLES OUT OF CEMENT MIX AND LIKE MATERIALS
Joseph J. Getman, Flushing, and Arthur J. Getman, Little Neck, N.Y., assignors to Precision Concrete Extrusion Corporation, Whitestone, N.Y., a corporation of New York
Filed Sept. 16, 1963, Ser. No. 309,104
13 Claims. (Cl. 264—312)

This invention relates to a method and an apparatus for preparing extruded shapes and in particular to a method and an apparatus for extruding straight or curved pipes and similar articles.

The object of this invention is to provide a method for making single or multiple conduits, pipes, beams, and other articles of like nature, in straight or curved form, of any length or size, with a round or angular hole or a plurality of holes, or a combination of circular or angular holes of different sizes, in a variety of outer and inner shapes. Another object is to provide a method for making such articles having specifically shaped ends. Another object is to furnish an apparatus for extruding any desired length of such articles. A further object is to furnish an apparatus for making extruded articles having shaped ends in a single extrusion operation. Another object is to furnish an apparatus for the continuous preparation of extruded pipes of various dimensions.

To accomplish the aforementioned and other objects according to our invention, we produce extruded articles of any desired length, having shaped ends, by first shaping the two ends of such articles from an extrudable material and then continuing to extrude the portion intermediate the ends until the required length is obtained.

The method of this invention involves continuously feeding the material into a chamber between two movable end forms mounted in close proximity to each other, shaping the ends, then moving the front end form away from the chamber, extruding the formed article from the chamber, discontinuing the feed when the desired length has been extruded, and removing the other shaped end of the article from the chamber.

The intermediate portion of the article is preferably extruded by the novel step of feeding the extrudable material onto a moving base inside the extrusion chamber after one of the end forms has been removed. This moving base moves the feed material through the chamber and carries the finished shaped article out of the chamber as it is formed. The moving base also provides a shaping surface for the bottom of the chamber.

This method is particularly adapted for preparing end-connective pipes and other hollow articles. In our preferred apparatus, the pipe, with the ends initially shaped, is extruded through an annular chamber having open ends through which the end forms move, stationary walls bounding the side and upper surfaces of the chamber, and a horizontally movable base. The walls and the base adjoin each other to form a continuous surface for shaping the outer perimeter of the pipe. The base, which may be supported on a rolling carriage, continuously carries the extruded pipe out of the chamber until the desired length is reached.

The preferred embodiments of the invention will be described with reference to the accompanying drawings in which—

Figure 1:
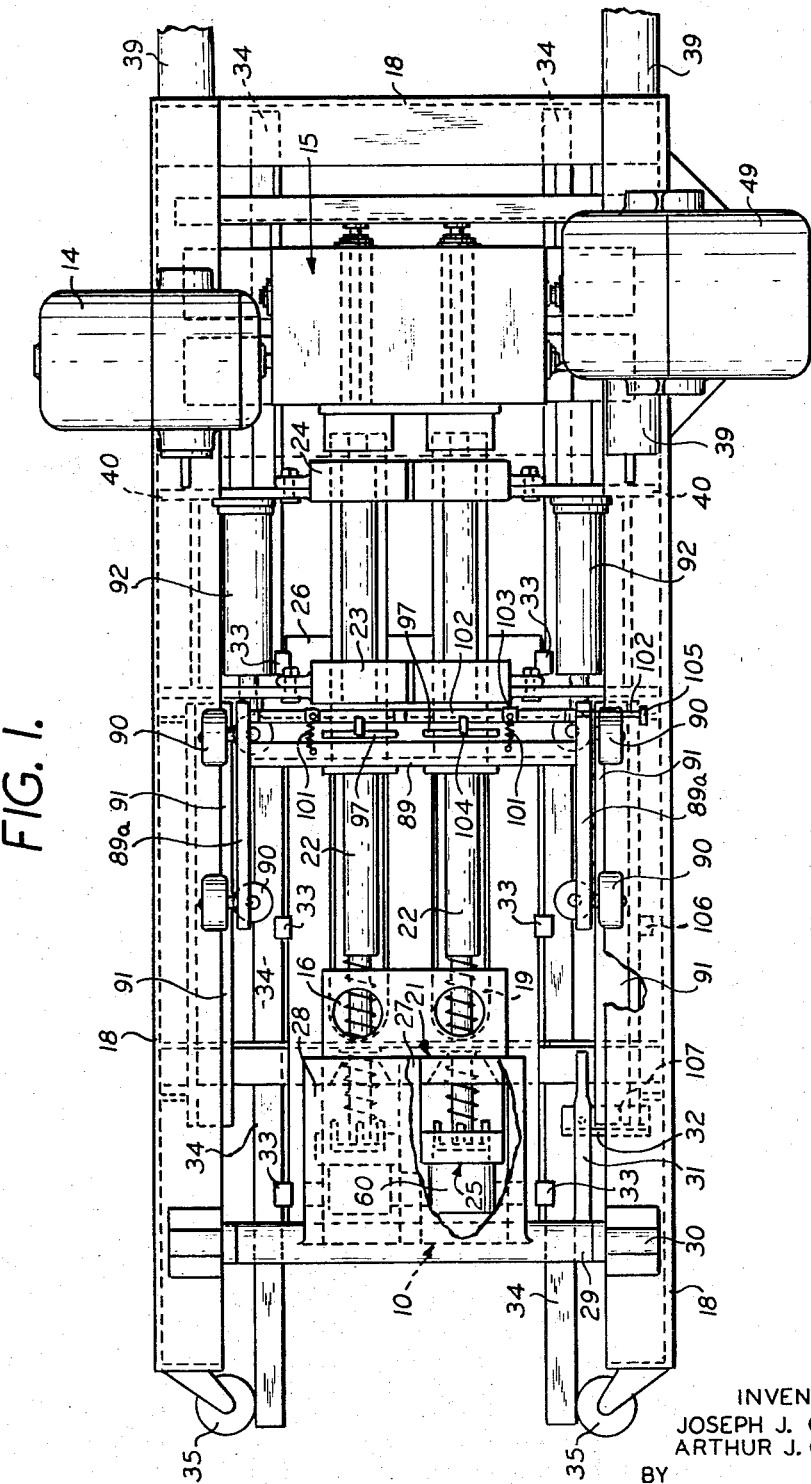
FIG. 1 is a top plan view partly broken away showing the extrusion apparatus.
Figure 2:
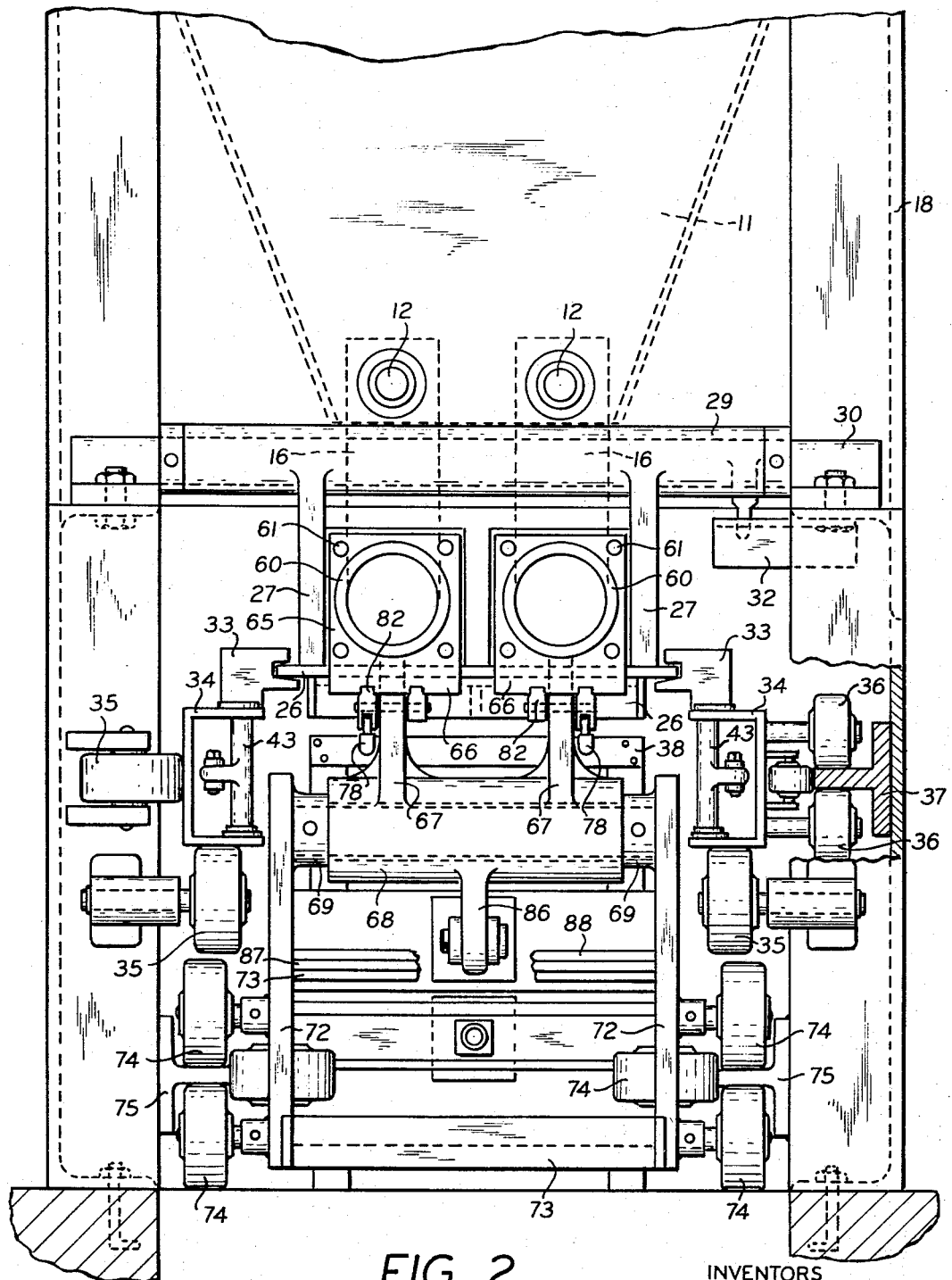
FIG. 2 is a front elevation view partly broken away of the apparatus, showing the front end assembly and the extrusion chamber.
Figure 3:
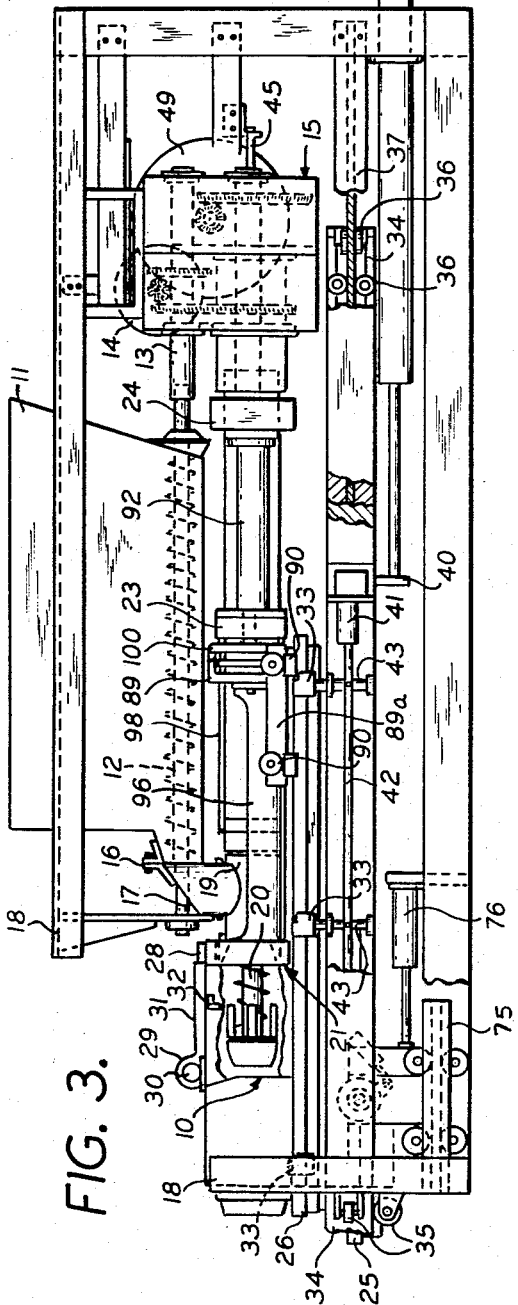
FIG. 3 is a side elevation view partly broken away showing the apparatus with an extruded article being withdrawn from the chamber.

FIGS. 1, 2 and 3 generally illustrate the preferred apparatus. Two extrusion units are shown in the apparatus whereby two square pipes having a circular opening are produced simultaneously. However, any number of such units can be used according to our invention. The forming elements or dies need not be identical in every unit so that a variety of shapes can be produced during each extrusion cycle. For the sake of simplicity, the following description is based on a single extrusion unit, although certain members are shown in the drawings in duplicate.

The extrusion unit, in its skeletal form, consists of four assemblies which may be separately controlled and which are preferably arranged to cooperate with each other in proper timed sequence as the extrusion operation proceeds. These are (1) the feed assembly, (2) the extrusion chamber assembly, (3) the front end assembly, and (4) the rear end assembly. Each assembly is referred to in the following description individually and as part of the overall apparatus.

(1) *The feed assembly*

The extrudable material is fed to the extrusion chamber 10 from an overhead storage hopper 11. Along the base of the hopper is a hopper screw 12 which is connected by a key or other means to a rotating driving shaft 13 behind the hopper. The shaft 13 is rotated by a motor 14, preferably a hydraulic motor, at a controlled speed. A gear box 15 contains a series of gear arrangements for independently controlling the speed of this shaft as well as the other rotating parts of the apparatus. Secured to the forward end of the hopper 11 is a vertical feed tube 16. The tube 16 is enclosed above by a cover plate 17, which is tilted at an angle to direct the material downward, and through which the hopper screw is rotatably extended. The forward end of the screw 12 is supported on bearings by a stationary supporting frame 18 which surrounds the entire apparatus.

The vertical tube 16 empties at the bottom into an enclosed horizontal tube or cylinder 19 behind the extrusion chamber 10 for holding the extrusion feed. The hopper screw 12 sends the feed forwardly into the vertical tube. As the feed material falls into the horizontal tube 19, an extrusion feed screw 20, which is rotatably extended through the tube 19 and through an open end form 21 in the rear of the extrusion chamber 10, moves the material into the chamber.

The extrusion feed screw 20 is keyed into a larger hollow driving shaft 22 just behind the horizontal tube 19. The shaft 22 is rotated in the rear of the apparatus by the hydraulic motor 14. Preferably, the two driving shafts 13 and 22 are geared to rotate at the same or proportional speeds. Two sets of bearings 23 and 24 support and facilitate the rotation of the shaft 22.

(2) The extrusion chamber assembly

The extruder unit may vary widely in form, construction, and operational details, but essentially it involves the stationary extrusion chamber 10, a movable front end form 25 enclosing the open front end of the chamber, the movable rear end form 21 enclosing the open rear end of the chamber and a movable base or pallet 26. A central die is horizontally mounted within the chamber for shaping pipes and other hollow articles.

The chamber 10 has stationary side walls 27, and a top 28 which may be opened for the purpose of cleaning the chamber. The top is secured horizontally to a tube 29 which is pivotally mounted around a stationary shaft 30, providing a hinge-like structure. Fastened to one end of the tube 29 is a lever 31 which has a downward projecting member for engaging a stationary bracket 32 at the side of the chamber. The lever is locked into the bracket during the extrusion to prevent the top from being forced open. Any simple locking device, such as a spring lock or a manual sliding device, may be employed. The stationary sections of the chamber 10 including the walls 27, the shaft 30 and the angle bracket 32 are supported on the outer stationary frames 18 and transverse members thereof.

The bottom of the chamber is provided by the movable base or pallet 26 which is in close slidable contact with the lower edges of the side walls 27 to prevent the feed material from flowing out through the lower edges of the chamber. The pallet is supported on a pallet carriage which includes three pairs of pallet fingers 33 for holding the pallet and two channel beams 34 on which the fingers are pivotally mounted. These beams extend along the entire length of the apparatus on both sides. The beams are movably supported on pairs of horizontal and vertical rollers 35 fastened to the stationary frame 18 in the front. In the rear, other rollers 36 are fastened to the beams 34 and these roll along two sets of tracks 37 which are bolted to the outer stationary frame 18. These tracks are T-beams having a horizontal member extending laterally toward the movable channel beams as shown in the broken portion of FIG. 2. The tracks lie along almost the entire length of the apparatus. The pallet carriage is propelled forward by hydraulic pressure from two stationary hydraulic cylinders 39 acting against a downwardly projecting beam 40 which is transversely fastened to the two pallet carriage beams 34.

The pallet fingers 33 pivot at least a quarter turn in their mountings when activated by two small hydraulic cylinders 41 mounted on the pallet carriage beams 34. The piston rods 42 of these cylinders extend forward and are fastened to the shafts 43 of the fingers on either side of the apparatus. When the piston rods are retracted by hydraulic pressure, the fingers pivot forward thereby releasing the pallet. The pallet fingers have a tapered surface so that as they release a pallet at the close of an extrusion cycle, the pallet is lowered slightly. These pivotal and vertical movements permit the fingers to grip the pallet, move it forward in a uniform horizontal plane, and deposit it onto a hydraulic pallet rack (not shown) in front of the apparatus which lowers the used pallet away and positions an empty one in place. The piston rods 42 are partially pushed forward, causing the pallet fingers to pivot inwardly to engage the new pallet and lift it slightly. The carriage is then retracted back toward the apparatus by means of the hydraulic cylinders 39.

With respect to the chamber proper, the feed screw 20 extends about halfway therethrough. This screw is hollow as is the shaft 22, containing concentrically an intermediate hollow rotating shaft 44 and an inner mandrel 45. A stationary core 46 is attached to the mandrel 45. A rotating packer assembly 47, bearing curved arms 48, is attached to the shaft 44, which is geared to a constant speed motor 49 in the rear of the apparatus. A series of packing shaft bearings may be placed between the two hollow shafts and between the intermediate shaft 44 and the mandrel 45, along the entire length of the nested assembly.

Figure 4:
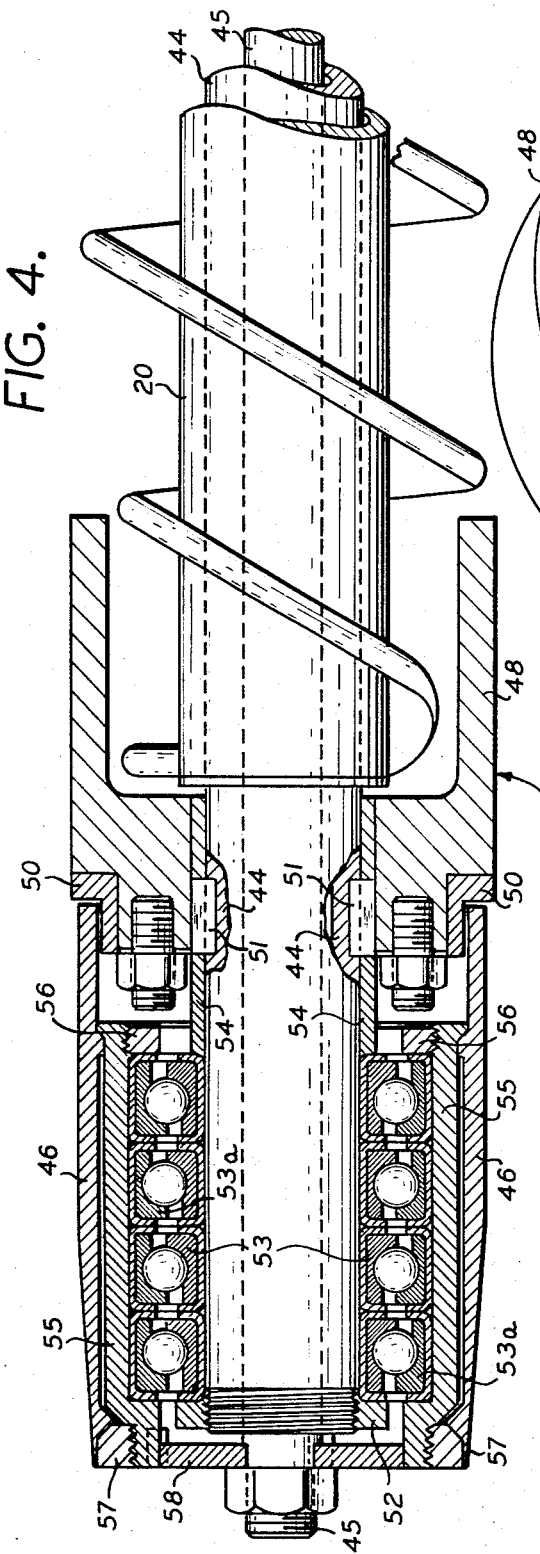
FIG. 4 is a section of the extrusion die and packer assembly.
Figure 5:
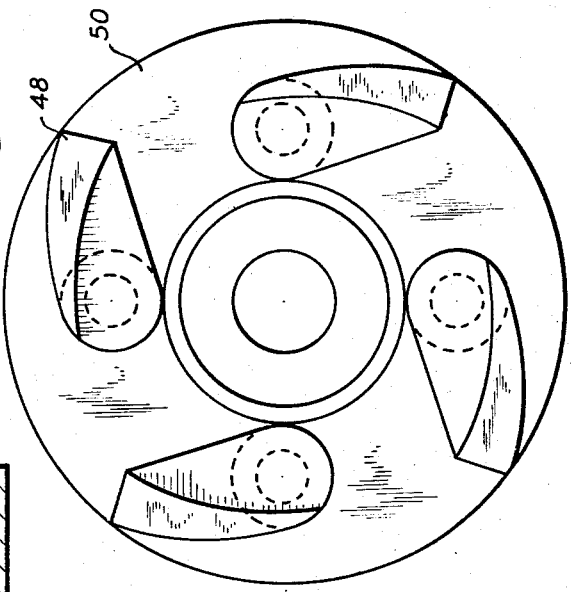
FIG. 5 is an end view of the packing assembly.

FIGS. 4 and 5 show the novel extrusion die and packer assembly in more detail. The packer arms 48 are bolted to the flange of a cylindrical collar 50 which is keyed into the intermediate shaft 44 by means of a feather key or spline 51. The shaft is threaded into a screw-threaded locking ring 52 which locks the inner races of a four-ring ball bearing unit 53 against the forward extending sleeve 54 of the collar 50, for rotation around the mandrel 45. The shaft 44, the locking ring 52, the collar, and the packer blades are therefore an independently rotatable unified assembly in relation to the feed screw 20, the core die 46, and the mandrel 45.

The core 46 is cylindrically shaped with ridges along the inside surface for locking engagement with an inner lining 55. The lining is threaded to a locking ring 56 for locking the outer bearing races 53a to the lining 55. Threaded to the front edge of the lining 55 is another locking ring 57 which is sloped to engage the forward inner ridge of the die. The lining is attached by means of a key to a front end disc 58 to which the mandrel 45 is fastened. The mandrel 45 is secured in the rear of the apparatus to the rear section of the stationary frame 18. The mandrel and core die are thus held in a stationary position, although they are demountable for the purposes of replacing the core die.

(3) Front end assembly

Figure 6:
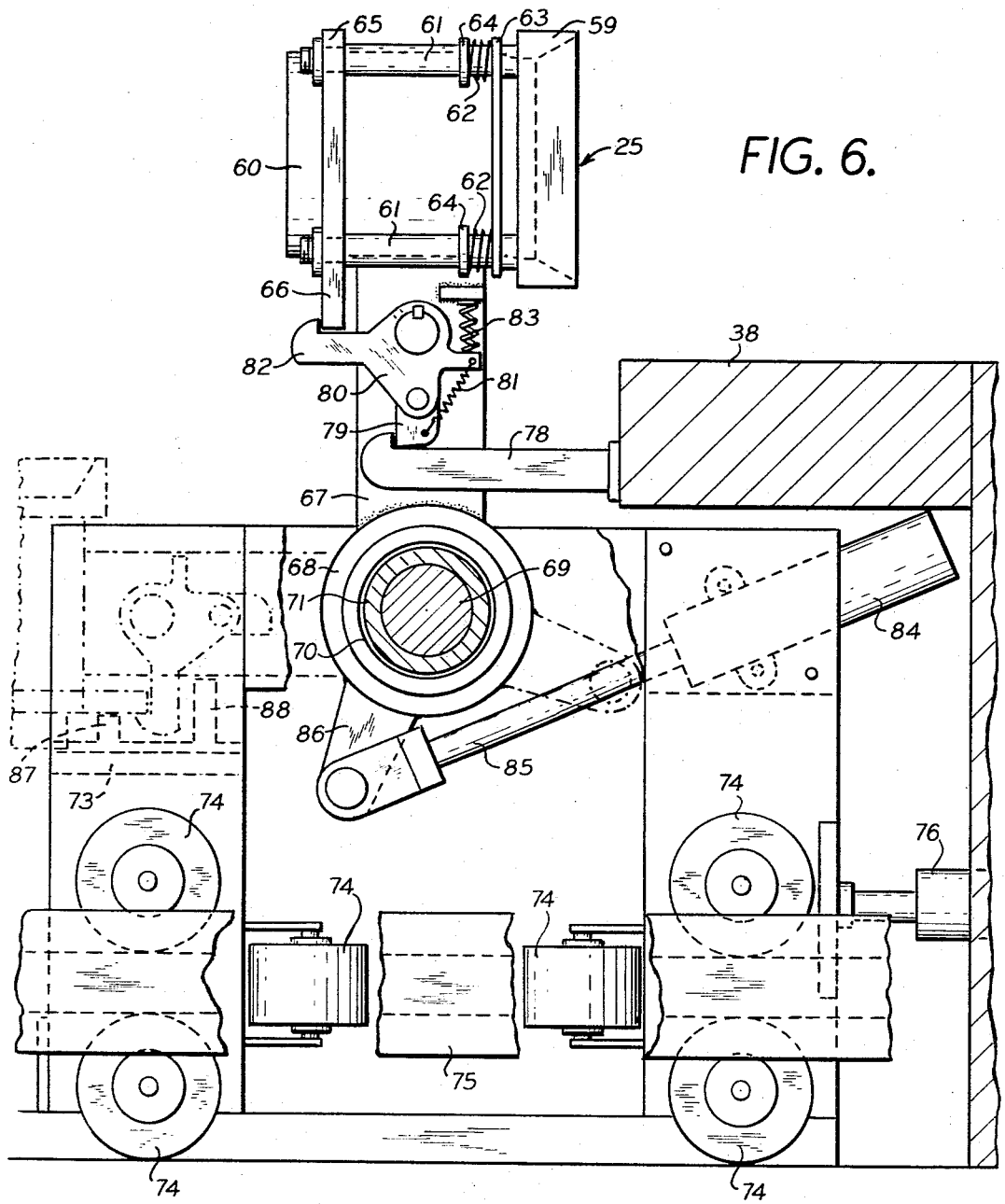
FIG. 6 is a section of part of the front end form assembly in detail.

FIG. 6 is a detailed view of the front end assembly. The front end form 25 is demountable two-piece assembly consisting of an outer tapered section 59 having a center opening and a cylindrical tube 60 having an overall outside diameter larger than the said opening and a reduced section near one end. The outer section 59 is movably seated around the reduced end of the tube which is slightly less than the diameter of the opening of the outer section. The outer section is thus able to slide along a restricted length of the tube. The core 46 is shaped to fit inside the tube so that no feed can be forced therebetween to plug the pipe opening while the ends are being shaped. At the start, the tube 60 and the outer section 59 enclose the die and the packer blades as indicated in the broken portion in FIG. 1.

The outer section is held in position around the tube by means of four movable rods 61 extending along the length of the tube and attached to each corner of the section 59. These rods carry compression springs 62 which are seated between a tube flange 63, fastened to the tube, through which the rods are slidably extended, and lock rings 64 welded to each rod so that movement by the rods toward the flange results in compressing the springs between the flange and the rings. At the other end of the tube 60 is a flat plate 65 having a central opening for slidably fitting around the tube and a projecting edge 66 extending downwardly from the tube. The rods 61 are bolted to the plate so that the plate, the rods and the outer section are a unified, movable assembly.

The tube 60 is mounted on a pivot arm 67 which is attached to a rotatable pivot tube 68. This tube rotates about a stationary shaft 69 on a bearing 70. The shaft 69 is fastened by collars 71 to a horizontally movable carriage composed of a series of supporting beams 72 and brackets 73. Twelve rollers 74 support the carriage on both sides along a short length of tracks or beams 75 fastened to the supporting frame 18. This carriage is moved horizontally forward on the tracks by means of a hydraulic cylinder 76 mounted on the inner supporting frame 38.

Since the extruded article is still in an unhardened or uncured state, sudden disengagement of the entire front end form 25 away from the formed end may fracture the article. To avoid this, the present invention provides a two-section end form in preference to unitary form. As the pallet and the front end form are moved forward out of the chamber, the outer tapered section 59 is pulled away from the extruded article separately to avoid damaging the formed end. The edge of the tube 60 meanwhile remains in contact with the article.

The progressive release of the form sections is obtained by a spring-lock mechanism. During the inital end-shaping step, while the pivot arm 67 is upright the plate 65 is locked around the tube to maintain the springs 62 under compression and to keep the outer section 59 in a proper position inside the chamber. A stationary projecting hook 78, secured to the inner supporting frame 38, engages a trigger 79 which is rotatably mounted on a lock swivel 80 attached to the pivot arm 67. The trigger pivots in association with the lock swivel 80 by means of a tension spring 81. The lock swivel has an extending hook 82 which holds the projecting edge 66 of the plate 65 to maintain the spring 62 in compression.

At the completion of the initial step of forming the ends of the article, the front end assembly moves horizontally forward on its tracks 75. The trigger 79, moving with the pivot arm, is rotated by the stationary projecting hook 78. This rotation turns the lock swivel 80 in the same direction, which motion compresses a swivel spring 83 secured to the pivot arm. The swivel hook 82 is disengaged from the projecting edge 66 releasing the plate 65 and relieving the compression on the springs 62. The plate 65 and the rods 61 slide forward along the tube 60 by the release of the springs and the outer tapered section 59 is pulled away from the shaped end of the pipe. The flat surface of the tube remains in contact with the pipe. As soon as the trigger 79 is free of the hook 78, the compressive force against the swivel spring 83 is removed. As the spring relaxes to its normal length, the lock swivel 80 is pivoted back. The swivel hook 82 is thus reset in locking position.

After the outer section 59 has been separated from the article, the front end assembly travels forward momentarily with the pallet carriage. At a predetermined time, the pivot tube 68 is rotated around the shaft 69 on bearing 70 by means of hydraulic pressure from the cylinder 84 mounted on the carriage. The cylinder piston 85 is pivotally linked for example, by a clevis or buckle, to an arm 86 fastened to the tube 68 whereby movement of the piston results in partial rotation of the pivot tube and pivot arm. The front end assembly is thus revolved forward through a 90° arc out of the path of the moving pallet 26 as indicated by phantom lines in FIG. 6. Just as the 90° arc is completed, the plate 65 is engaged by a seat 87 secured to a transverse bracket 73 mounted on the front end assembly. The projecting edge 66 thereupon slides slightly upward and engages the lock swivel hook 82 as before. This movement again compresses the springs 62 and repositions the outer section 59 at the edge of the tube 60. The seat 87 and an arm stop 88 also mounted on the bracket support the pivot arm and front end form while not in use.

The front end assembly is replaced within the chamber 10 for the next extrusion operation by simple reversing the above steps. Hydraulic cylinder 84 pushes out piston 85 which rotates the tube 68 back through the 90° arc to its upright position and the entire unit is rolled backward by hydraulic cylinder 76 until the form is inside the chamber and trigger 79 is again in locked engagement with the stationary hook 78.

(4) *Rear end assembly*

Figure 7:
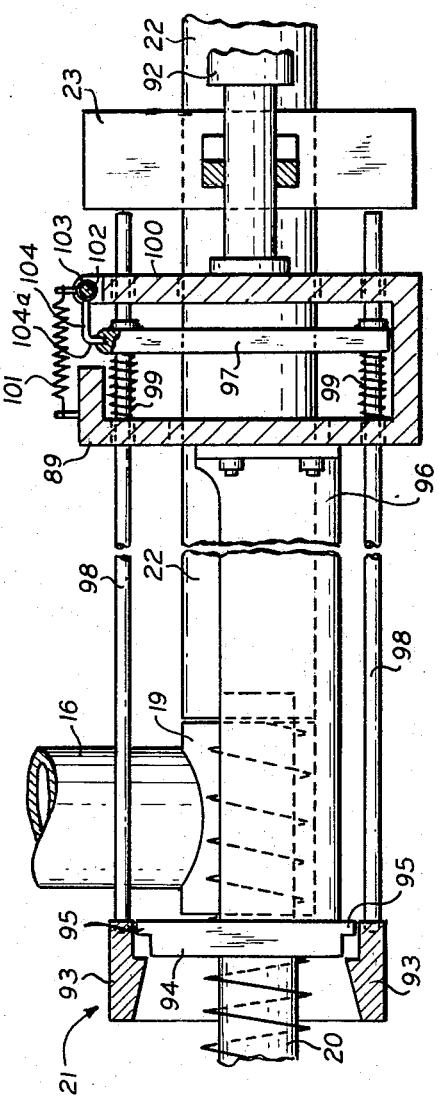
FIG. 7 is a shortened section of the rear end form assembly in detail.

FIG. 7 illustrates the rear end form and the auxiliary assembly in detail. The assembly includes the rear end form 21 and a transverse rear end extrusion beam 89. The extrusion beam is movably supported on a carriage consisting of two side beams 89a bearing rollers 90 which run along a short set of T-beam tracks 91 fastened to the frame 18. The beam is rolled along the tracks by means of hydraulic cylinders 92. During the extrusion, the beam is stationed behind the horizontal tube 19 at a distance of at least the length of the tube plus the length of the extrusion chamber 10. The beam has access openings for the shaft 22 to permit the beam to move forward without interference.

The rear end form within the chamber consists of a two-piece unit, resembling the front end form. This form may either be connective, or opposite, to the front end form or identical to it. In FIG. 7, the form is the same as the front end in FIG. 6. An outer tapered section 93 and an inner flat section 94 are movably held together, as in the front end form, the outer section being set slightly forward of the inner section. The outer section is adapted to move backward this short distance before being stopped by a flange 95 on the inner section.

To the inner section 94 is welded an open trough-like housing 96 which extends backward from the chamber 10 to the beam 89 and bolted thereto. The housing, the inner section, and the extrusion beam are thus a unified movable assembly. The horizontal tube 19, at the lower end of the vertical tube 16 is suspended inside the open housing 96 without contact. The outer section of the rear end form is connected to a spring plate 97 situated behind the beam 89 by means of four rods 98. These rods are slidably mounted through the beam 89 and bolted to the spring plate 97. Intermediate the beam and the plate, on the rods 98 are compression springs 99.

A second transverse beam 100 is welded to the extrusion beam 89, the plate 97 being intermediate the two. The four horizontal rods 98 extend slidably through the beam 100 backward as far as the housing for the drive-shaft bearings 23. The beam 100 supports a pivot shaft 102 which is rotatably held by bearings along the length of the shaft. The shaft 102 extends transversely toward the stationary frame 18 and terminates in a pivotal tripping device 105.

Welded to the shaft are cylindrical collars 103 each having fastened thereto a locking lever 104 and a tension spring 101. The other end of the spring is fastened to the beam 89. The upper surface of the spring plate 97 is notched to receive an extending catch member 104a on the lever 104. This spring-locking mechanism locks the spring plate 97 in place. During the extrusion step, the plate is held close to the beam 89 to compress the springs 99 slightly. The two beams, 89 and 100, and the plate 97 are thus held together by the springs 101 and locking lever 104.

At the end of the extrusion step, the rear end form 21 follows the extruded pipe, which is moving forward through the extrusion chamber, and is disengaged from it at the front of the chamber. The two hydraulic cylinders 92 are actuated to move the entire rear end assembly forward. The rear end form is pushed through the chamber by the moving beam 89 and the open housing 96 at the same speed as that of the moving pallet. Since the beam 89 and plate 97 are locked together, both the open housing 96 and the rods 98 keep the two sections of the rear form 21 in proper position. The beam 89 moves forward along its tracks 91 until the extended pivot 105 engages a cam block 106 mounted on the frame 18. The engagement of the pivot and the block pivots the shaft 102 and unlocks the spring plate 97. The release of compression on the springs 99 causes the spring rods 98 to pull the outer section backward slightly away from the extruded article. The inner section momentarily follows the shaped end until the rear end extrusion beam 89 activates a limit switch 107, located on the stationary side frame or on the tracks 91, stops the beam and component parts, and returns them to their original position by the hydraulic cylinders 92. At this point, the extruded article has completely exited from the chamber.

Operation of a single extrusion unit of the apparatus as above described is as follows: Cement, or similar feed material, in hopper 11 is fed forwardly by the hopper feed screw 12 to the vertical feeding tube 16 through which it falls by gravity into the horizontal tube 19. The extrusion feed screw 20 picks up the falling feed inside the tube and pushes it through the opening of the rear end form 21 into the extrusion chamber 10. The feed is thereupon subjected to a centrifugal force by the rotation of the upturned packer arms 48. The material is spread outward against the stationary walls 27 and top 28 and forced simultaneously into the front end form 25 and the rear end form 21, until the chamber space is completely filled. The extrusion force comes from the kneading motion of the rotating packer arms and the forced feeding of material into the chamber.

Both the pallet 26 and the front end assembly are then moved forward, by hydraulic cylinders 39 and 76 respectively, while the rear end form remains stationary and in contact with the already shaped rear end of the article being extruded. In this initial forward movement the outer tapered section 59 of the front end form is disengaged as described earlier. A moment later, the pivot arm 67 is rotated downward 90° out of the path of the moving pallet by the hydraulic cylinder 84.

Material is continually forced into the chamber 10 through the rear end form and is carried out by the pallet, in its shaped form as shown in FIG. 3. The beams of the pallet carriage move toward the pallet rack in the front of the apparatus. Since the movements of the packer arms, the feed screws, and the pallet carriage are controlled by separate and independent operating means, the speed of each of these units may be so varied that pipe walls of almost any desired density may be obtained. The thickness of the pipe may be varied also by using dies and packers of different dimensions.

When the prescribed length has been obtained including that length still remaining in the chamber, all feed screws are stopped and the entire rear end assembly is moved forward by means of the hydraulic cylinders 92. The forward movement of the assembly pushes the rear end form through the chamber by the housing 96 attached to the flange 95 of the inner section 94. When the pivot 105 on the shaft 102 engages the cam block 106, the shaft rotates the lever 104 upward, unlocking the plate 97. The compressed springs 99 are released and pull the rods 98 backward, until the outer tapered section 93 strikes the flange 95. This breaks contact between the outer section and the rear end of the pipe. The tension spring 101, meanwhile, re-pivots the shaft causing the catch 104a to rest on the upper surface of the plate 97.

The rear end assembly continues forward momentarily until the extrusion beam carriage engages the limit switch 107 which stops the hydraulic cylinders 92, thereby causing the inner section 94 to part from the pipe as it is carried from the extrusion chamber. The switch is so placed along the path of the extrusion beam that when the engagement occurs, the rear end of the pipe is just exciting from the chamber. The entire rear end assembly is then retracted by the cylinders 92. As the assembly returns to its original position and locking lever 104 is reset to lock the spring plate 97 by engagement between the ends of the rods 98 and the bearing housing which forces the plate forward to receive the catch 104a. When the rear end assembly is finally stopped, the springs 99 are again compressed between the extrusion beam 89 and the locked plate 97. The re-locking step may be facilitated if the upper surface of the spring plate 97 is rounded, as a cam surface, or inclined. When the plate is pushed forward by the engagement between the bearing housing and the rods, the lock catch 104a will travel more easily toward the notch.

As the loaded pallet is carried onto the pallet rack, the two carriage beams 34 extend considerably outward from the front end of the stationary frame 18. The beams are supported by both the rollers 35 attached to the frame and the rollers 36 on the tracks 37, and by suitable supports on the pallet rack. The pallet fingers are pivoted forward to release the pallet onto the rack. A new pallet is positioned in its place and the fingers are pivoted back to clamp it in place. Then the carriage beams 34 are rolled back thereby placing the pallet directly below the walls of the extrusion chamber.

The above procedure may be used in producing solid extruded shapes such as posts and beams. The central core die 46, the packer 47, and the connecting shafts are removed from the chamber. The chamber is preferably lined with tapered liners to restrict the front end somewhat. The front end form consists of a solid plate or plate sections, and the rear end form is a plate having an access hole for the feed screw. As the feed material is extruded through the chamber, the tapered liner compacts the shaped form for the desired density and dimensions.

Curved lengths of pipe and beams and allied articles may also be prepared by inserting curved liners into the extrusion chamber. The carriage beams 34 are curved, and the front and rear end assemblies move along curved tracks, both beams and tracks having a radius related to that of the liners. Instead of the troughlike open housing 96 used to push the rear end form through the chamber, four rods connect the inner section of the rear form to the extrusion beam. These rods are preferred for moving the rear end form along a curved path. The two sections of the rear form may also be set at a slight angle to the extrusion beam to further facilitate the travel of the form through the chamber. The straight die shown in FIGS. 4 and 5 is replaced by a curved die so that the inside opening has a curvature relative to the outer surface of the pipe. A spherical die may also be used in place of a curved die. The operating steps previously described are applicable for making curved articles.

The apparatus is readily operated on a continuous basis using an automatic system of timed electrical switches and relays for the hydraulic pressure units. The feeding screws 12 and 20 are started, commencing formation of the ends of the article. After a predetermined time, hydraulic cylinders 76 and 39 are activated by an automatic switch to move the front end assembly and the pallet carriage.

A second switch activates the hydraulic pressure cylinder 84 to rotate the front end form 25 away from the chamber 10 as the front portion of the extruded article protrudes. At the end of the operation, a third switch stops the feed screws 12 and 20 and activates the hydraulic cylinders 92 moving the rear end extrusion beam 89 forward on its rollers. The rear end form 21 is pushed through the chamber. The engagement between the limit switch 107 and the extrusion beam assembly stops the rear end unit and retracts the beam. As the rear end beam is retracted, a fourth switch is engaged to pivot the pallet fingers 33 by the small hydraulic cylinders 41 to release the pallet onto the pallet rack. A series of auxiliary switches attached to the pallet rack moves the old pallet away and positions an empty pallet in its place, pivots the fingers back to clamp it, and retracts the pallet carriage. The retracting pallet carriage engages a final contact switch to rotate the front end pivot tube 68 upward and roll the front end form into the chamber. This last movement opens the first switch again to repeat the cycle.

In addition to the products mentioned herein, the method of this invention may be adapted to produce pipes and conduits having multiple openings and also articles having reinforcing members imbedded therein. Minor variations in the preferred apparatus permits the extrusion of such products without exceeding the scope of our disclosure.

It will also be understood that the extrusion apparatus of the present invention may be mounted on a movable vehicle so that the extruded product can be placed directly in a prepared location, such as a trench, in any desired lengths.

The detailed description relates to a preferred form and we do not wish to be restricted to that specific form, but to reserve those variations and modifications not disclosed herein which may be evident to those skilled in the art and which is within the scope of the following claims.

What we claim is:

1. The method of extruding end-connective articles of a desired length comprising the steps of continuously feeding an extrudable material into a chamber having top, bottom and side walls and movable end forms for shaping the front and rear ends of such end-connective articles, initially shaping the front and rear ends of said end-connective articles to conform to said movable end forms, removing the front end form from the front shaped end thus formed, then continuously extruding the portion intermediate the two ends until it is of the desired length, and then discontinuing the extrusion and ejecting the article through the chamber.

2. The method according to claim 1, wherein the base member of said chamber is movable longitudinally relatively to said side and top members of said chamber, and wherein the continuously extruded portion intermediate the ends of said end-connective articles is moved through the chamber on said movable base.

3. The method according to claim 2 wherein said end-connective articles are hollow and said chamber is annularly spaced, comprising the additional steps of extruding the portion intermediate the two ends through the annular space by centrifugally spreading said material and compacting it while said end-connective articles are moved through said chamber on said movable base.

4. An apparatus for producing end-connective extruding pipe comprising
   (a) an annular-spaced extrusion chamber having stationary side walls, a top surface, a front access opening and a rear access opening adapted to be engaged by movable end forms to close the same, a movable base situated in close contact with the lower edges of said side walls and adapted to move in a frontward horizontal path; and a central shaping means forming an annular space within the chamber, said shaping means being horizontally disposed between the front and rear access openings having a front member and a relatively rotatable rear member;
   (b) a front end form assembly for cooperatively engaging the said front access opening and contacting said front member of said shaping means, adapted to be disengaged from the pipe within said access means progressively and removed from the horizontal path of said movable base;
   (c) a rear end form assembly for cooperatively engaging the rear access means, having a center opening, and adapted to be pushed through the chamber and to be disengaged from the pipe progressively;
   (d) a feed screw rotatably extended through the center opening of the rear end form into the chamber for feeding extrudable material into the chamber at a point between the rear end form and the rotating rear member of said shaping means; and
   (e) means for moving the rear end form and a segment of the intermediate portion out of the extrusion chamber.

5. The apparatus of claim 4 wherein the movable base is supported in close slidable contact with the lower edges of the side walls of the extrusion chamber by means of two parallel beams on either side of the apparatus, a number of finger grips secured to said beams and supporting said movable base, a series of axially stationary rollers upon which the beams are movably supported, and a means for moving said beams.

6. The apparatus of claim 4, wherein the front end form assembly consists of a two-section end form adapted to be progressively disengaged from the front end of an extruded pipe, a pivotal means mounted transversely to said extrusion chamber, and attached to one section of the end form, and a means for holding said end form in engagement with the front access opening and for pivoting said means thereby removing said front end form from the horizontal path of the movable base.

7. The apparatus of claim 4, wherein the rear end form assembly consists of a two-section end form adapted to be progressively disengaged from the rear end of an extruded pipe, a movable beam transverse to said extrusion chamber and attached to one section of said rear end form, a plate in locking engagement with said beam and attached to the second section of the end form by horizontal rods, and wherein said means for moving the rear end form and a segment of the intermediate portion out of the extrusion chamber comprises means for moving said beam in a frontward horizontal direction whereby the rear end form is pushed frontward through the chamber, and a means for stopping the movement and unlocking said plate from said beam and permitting each section of the rear end form to be progressively disengaged from the extruded pipe.

8. An apparatus for extruding end-connective articles of a desired length comprising an extrusion chamber having top, bottom and side walls and front and rear movable end forms for shaping the front and rear ends of such end-connective articles, feeding means for introducing an extrudable material into said chamber at a point between the two end forms and to force the same against such end forms to shape the ends of the article, separate operating means for disengaging the end form from the front end of the article after it has been formed, said feeding means adapted to continuously feed such extrudable material between said front and rear shaped ends until the desired length has been attained and to move the front formed end of the article and, the intermediate portion of the article through said chamber, separate operating means for moving the rear end form through said chamber, and means for disengaging said rear end form from said article.

9. Apparatus according to claim 8 wherein the bottom wall of said chamber is a movable base on which said end-connective articles are moved through said chamber as they are being formed and on which they are delivered exteriorly of said chamber when they have attained the desired length.

10. Apparatus according to claim 9 wherein each of said front and rear end forms have at least two separate sections, which are disengageable from said ends of the article one section at a time.

11. Apparatus according to claim 10 wherein there is a core die disposed horizontally within said chamber at its front end, and said feeding means comprises a rotatable feed screw rearwardly of said core die, said feed screw extending through a central opening in said rear end form.

12. Apparatus according to claim 11 having a rotatable packer intermediate said core die and said rotatable feed screw, said packer having a plurality of upturned blades which centrifugally distribute feed to the chamber surfaces and compacts the same.

13. An apparatus for extruding end-connective articles of a desired length comprising an extrusion chamber having curved inner surfaces corresponding to a segment of the arc of such curved article, said extrusion chamber having top and side walls, a movable base, front and rear movable end forms initially closing said chamber for shaping the front and rear ends of such end-connective articles, feeding means for continuously introducing an extrudable material into said chamber at a point between the two end forms, separate means for disengaging the front end form from the article after said front and rear ends have been shaped, said feeding means moving said front end portion and said extruded portion intermediate the ends out of said chamber upon said base member, said base member being movable along a curved path corresponding to the curve of the desired article, said rear end form movable through the chamber along its curved path when the desired length has been attained, and means for disengaging said rear end form from said article.

References Cited

UNITED STATES PATENTS

| | | | |
|---|---|---|---|
| 994,496 | 6/1911 | Berrigan | 264—270 |
| 1,007,974 | 11/1911 | Rees | 25—14 |
| 1,117,466 | 11/1914 | Wewerka | 25—30 |
| 2,276,261 | 3/1942 | Buzard | 25—14 |
| 2,404,464 | 7/1946 | Sewell | 25—30 |
| 2,443,053 | 6/1948 | Parmelee | 264—209 X |
| 2,513,289 | 7/1950 | Crom | 264—309 X |
| 2,611,941 | 9/1952 | Leitl | 25—14 |
| 2,979,798 | 4/1961 | Price | 264—309 X |

FOREIGN PATENTS 286,498  3/1928  Great Britain.

ROBERT F. WHITE, *Primary Examiner.*

L. S. SQUIRES, S. I. LANDSMAN, A. R. NOË,

*Assistant Examiners.*